June 17, 1952
M. B. KNIGHT
2,601,153
HIGH-VOLTAGE SUPPLY
Filed Feb. 19, 1951
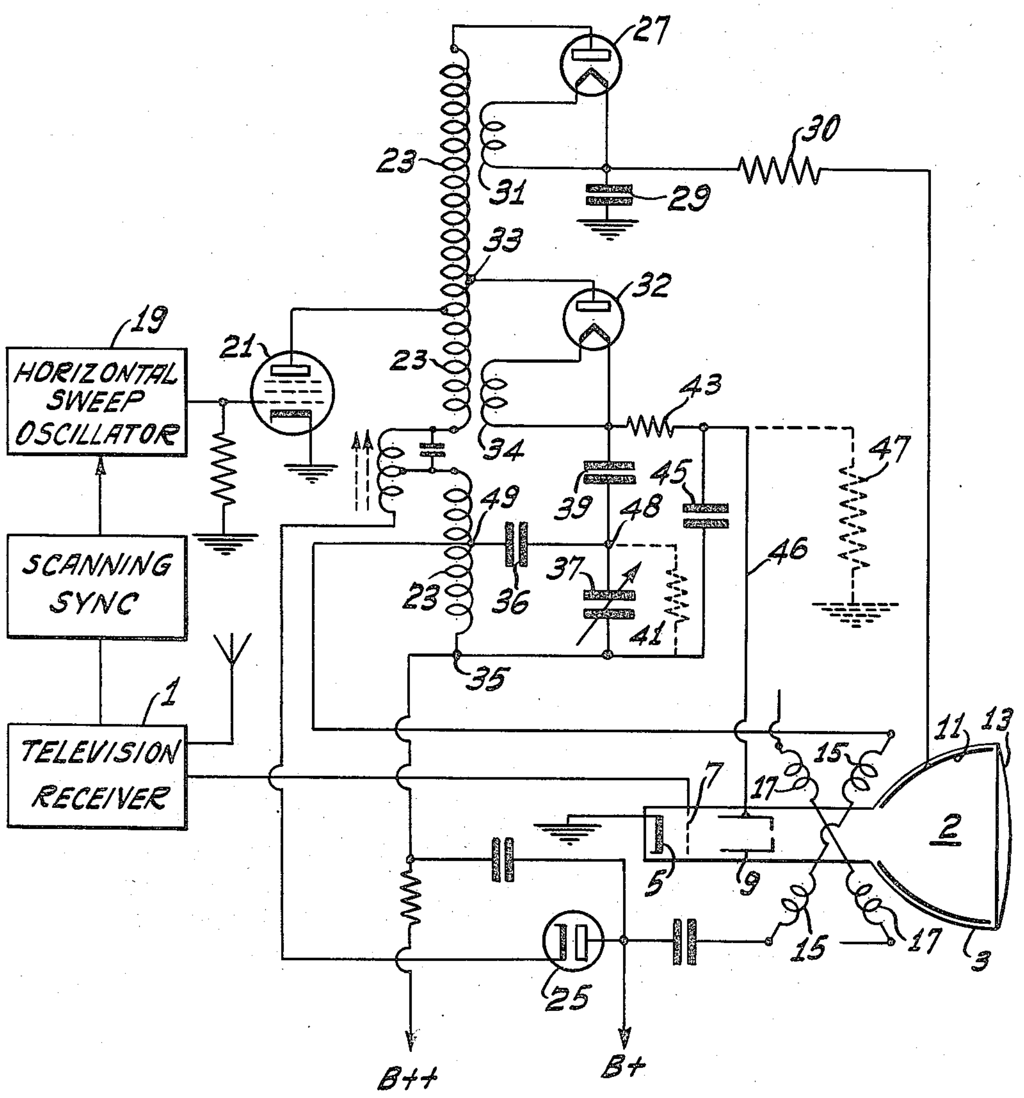
INVENTOR
Mark B. Knight
BY
ATTORNEY Patented June 17, 1952

2,601,153

UNITED STATES PATENT OFFICE 2,601,153

HIGH-VOLTAGE SUPPLY

Mark B. Knight, East Orange, N. J., assignor to Radio Corporation of America, a corporation of Delaware Application February 19, 1951, Serial No. 211,636

6 Claims. (Cl. 315—31)

This invention relates to variable high voltage supply systems, and particularly, to systems for supplying an adjustable voltage of high magnitude between the cathode and another electrode of a cathode ray tube.

In apparatus employing cathode ray tubes of the electrostatic focusing type, it is customary to apply a very high unidirectional positive potential to the second anode and a somewhat lower, adjustable, unidirectional positive potential to the first or focusing anode of the cathode ray tube. The first anode potential is made adjustable so that the cathode beam may be brought into focus. Thus, in a television receiver employing an electrostatically focused cathode ray tube, the "focus" adjustment in effect varies the potential impressed upon the first or focusing anode.

Heretofore it has been the usual practice to obtain the focusing potential by means of a conventional potentiometer voltage divider. Such a potentiometer arrangement is expensive, involves difficulties in insulating it for the high voltages involved and has the further disadvantages of drawing an appreciable amount of current thereby draining power from the source, and of giving poor voltage regulation.

It is accordingly one object of this invention to provide an improved method of and means for obtaining an adjustable unidirectional high voltage.

It is another object of this invention to provide an improved method of and means for obtaining an adjustable unidirectional high voltage for the focusing anode of a cathode ray tube.

A further object of this invention is to provide an improved means for controlling the amplitude of a unidirectional voltage which produces a minimum load on the voltage source.

According to the invention, an adjustable potential for the focusing anode of a cathode ray tube is obtained by the addition or subtraction of two component A.-C. potentials, one of which is made variable by means of a capacitance voltage divider. The resultant A.-C. potential is rectified and applied to the focusing anode. The capacitors used in the divider are small and inexpensive units.

Others and incidental objects of this invention will be apparent to those skilled in the art from a reading of the following specification and an inspection of the accompanying drawing, in which there is shown an embodiment of this invention.

Referring now to the drawings, this invention is shown applied to a television receiver 1 which includes an electrostatic focus picture tube 2. The particular picture tube illustrated is of a well known type comprising an evacuated envelope 3 having an electron gun therein which comprises a cathode 5, a control grid 7, and a first or focusing anode 9. A second anode 11, consisting of conductive coating on the inside of the envelope 3, is provided for accelerating the electrons and for aiding in electrostatic focusing. The usual fluorescent screen 13 is provided at the large end of the tube.

In accordance with common practice, the picture tube is provided with one pair of deflecting coils 15 for deflecting the electron beam horizontally, and another pair of deflecting coils 17 for deflecting the electron beam vertically, whereby the fluorescent screen 13 may be scanned to produce a picture. Details relating to the television receiver and vertical deflection are not illustrated as any of the usual types may be employed, such as, for example, those shown and described in an article by A. Wright in RCA Review for March 1947.

A horizontal sweep oscillator 19 supplies a saw tooth potential to the grid of the horizontal sweep output tube 21, which in turn supplies a saw tooth current component to the output transformer 23. During the horizontal trace the deflection current increases linearly in the horizontal deflection coils 15, and a corresponding magnetic field is produced. During the retrace period the output tube 21 is cut off, and the sudden removal of plate current causes a sudden collapse of the magnetic field. This collapse in turn causes a high amplitude transient voltage pulse to appear across the horizontal deflection coils 15. A damper tube 25 prevents this transient voltage pulse from setting up a series of oscillations.

This high amplitude pulse, which has a peak amplitude of the order of several thousand volts, is stepped up by the horizontal output transformer 23, which is shown as an auto-transformer. A high voltage rectifier 27 is connected between the high voltage terminal of transformer 23 and the second anode 11 of cathode ray tube 2. The high voltage rectifier 27 rectifies this transient voltage to produce, after filtering by capacitor 29 and a resistor 30, a constant high voltage D.-C. potential.

The filament of the high voltage rectifier 27 is energized by means of a few turns of wire 31 wound on the core of the horizontal output transformer 23.

The first or focusing anode potential, which is be adjustable, is obtained in a somewhat simi- r fashion. A high voltage rectifier 32 has its ate connected to tap 33 of the horizontal out- ıt transformer 23. The filament of the recti- ›r 32 is energized in the same fashion as that rectifier 27, by means of conductors 34.

According to this invention the cathode of rec- ier 32 is returned to a point where there is a ılse of the same or opposite phase as the pulse ıpressed upon the rectifier anode. The two ılses are then added or subtracted, and the re- lting pulse is adjusted by varying one of the mponent pulses.

In the particular embodiment of this inven- ɔn shown in the drawing, this result is accom- ished as follows:

Considering point 35 as the point of reference, e direction of current flow during retrace is ch that all points on transformer 23 will be ›sitive with respective thereto.

The A. C. potential of the cathode of rectifier is determined by an impedance network whose ırameters may be altered. This impedance net- ɔrk is the capacitance voltage divider formed capacitors 36 and 37. Either capacitor 36 or pacitor 37, or both, may be variable. Capaci- r 39 couples the cathode to the voltage divider d also blocks the direct current present on the ctifier cathode so that capacitors 36 and 37 n be of a less expensive variety. It is de- able to place a resistor 41 of high value in rallel with capacitor 37 to prevent the build- of a charge from capacitor leakage. Resistor and capacitor 45 filter the output of rectifier . That filtered output is applied to the first focusing anode 9 of tube 1 by means of lead . A high resistance 47 may be provided to nnect the focusing anode 9 to ground in order prevent the build up on the focusing anode 9 a potential due to interelectrode leakage cur- ıts.

Taking a point 48 as a reference point, capaci- 39 is connected between reference point 48 d the filament of rectifier 32. Capacitor 37 is ınected between reference point 48 and hori- ıtal output transformer terminal 35; and ɔacitor 36 is connected between reference point and a tap 49 on horizontal output trans- mer 23. Tap 49 is located between tap 33 and minal 35 of horizontal output transformer 23. The D. C. output voltage, which is the voltage which capacitor 39 is charged, is equal to the ference in pulse voltage between tap 33 and erence point 48. The pulse voltage at refer- ce point 48 is itself determined by the relative ues of capacitors 36 and 37. The output voltage ı therefore be adjusted by varying capacitor 37. Variation in the value of capacitor 37 changes position of the point located between points and 49 on transformer 23, to which the cathode rectifier 32 is effectively connected. The ɔice of pulse voltages applied to the impedance work depends upon the positions of taps 33 d 49 on transformer 23 and are determined the desired output voltage and the desired tage variation. Capacitors 36 and 37 should small to have a minimum effect upon the onant frequency of the system.

The following is a numerical example illus- ting the operation of the capacitance voltage ider circuit. Let us assume that the peak tages at taps 33 and 49 with respect to refer- ce point 35 to be 4000 and 1000 volts respec- ely. Let us further assume the following values of circuit components: capacitors 39 and 45, 500 mmf., 5 kilovolts; resistor 43, one megohm; capacitor 36, 33 mmf.; and variable capacitor 37, 10 to 100 mmf.

At the minimum value of the variable capacitor 37, the voltage at point 48 with respect to reference point 35 will be $$1000\frac{1/10}{1/33+1/10}=767 \text{ volts}$$

and the D.-C. output voltage will be 4000−767=3,233 volts.

At the maximum value of variable capacitor 37, the voltage at point 48 with respect to reference point 35 will be $$1000\frac{1/100}{1/33+1/100}=248 \text{ volts}$$

and the D.-C. output voltage will be 4000−248=3,752 volts.

In the foregoing example it will be seen that a focusing voltage variation of ±250 volts can thus be obtained.

This focusing voltage range is obtained with the use of small inexpensive capacitors. The applicant's invention avoids the use of an expensive potentiometer arrangement. The saving effected is substantial, and all the more valuable since applicant's invention finds its application in a field where production in great quantities is the general rule. A further advantage of applicant's invention is that the circuit arrangement disclosed drains less power than would a potentiometer arrangement. Better voltage regulation is also obtained.

Having thus described my invention, what is claimed is:

1. A high voltage power supply comprising a transformer having a plurality of connecting points thereon, a rectifier having first and second electrodes, means to connect the first electrode to one of the connecting points on the transformer, an impedance network comprising two impedance elements connected between two other connecting points on the transformer, means to connect the second electrode to a point on the impedance network intermediate said two impedance elements, and means to alter the parameters of the impedance network to effectively connect the second electrode to a point on the transformer intermediate the two other connecting points.

2. A high voltage power supply comprising a transformer having a plurality of connecting points thereon, a rectifier having first and second electrodes, means to connect the first electrode to one of the connecting points on the transformer, a capacitance network comprising two capacitance elements connected between two other connecting points on the transformer, means to connect the second electrode to a point on the capacitance network intermediate said two capacitance elements, and means to alter the parameters of the capacitance network to effectively connect the second electrode to a point on the transformer intermediate the two other connecting points.

3. A high voltage power supply comprising a transformer having a plurality connecting points thereon, a rectifier having an anode and a cathode, means to connect the anode to one of the connecting points on the transformer, a capacitance network comprising two capacitors connected between two other connecting points on the transformer, means to connect the cathode to a point on the capacitance network intermediate said two capacitors, and means to alter the parameters of the capacitance network to effectively connect the cathode to a point on the transformer intermediate the two other connecting points.

4. A high voltage power supply for an electrostatically focused cathode ray tube comprising a focusing electrode, said high voltage power supply comprising a transformer having different connecting points thereon, a rectifier having an anode and a cathode, means connecting the anode of said rectifier to a first connecting point on said transformer, a capacitance voltage divider comprising two capacitors each having first and second terminals, means connecting the first terminal of one of said capacitors to a second connecting point on said transformer, means connecting the first terminal of the other of said capacitors to a third connecting point on said transformer, a common connection between the second terminals of said two capacitors and the cathode of said rectifier, and means connecting the cathode of said rectifier to the focusing electrode of said cathode ray tube.

5. A high voltage power supply for an electrostatically focused cathode ray tube comprising a first anode and a second anode, said high voltage power supply comprising a transformer having a plurality of different connecting points thereon, a first rectifier having an anode and a cathode, means connecting the anode of said first rectifier to a first connecting point on said transformer, means connecting the cathode of said first rectifier to the second anode of said cathode ray tube, a second rectifier having an anode and a cathode, means connecting the anode of said second rectifier to a second connecting point on said transformer, a capacitance voltage divider comprising two capacitors, means connecting one of said capacitors to a third connecting point on said transformer, means connecting the other of said capacitors to a fourth connecting point on said transformer, a common connection between said two capacitors and the cathode of said second rectifier, means connecting the cathode of said second rectifier to the first anode of said cathode ray tube, and means to vary the value of one of said capacitors.

6. A high voltage power supply for an electrostatically focused cathode ray tube comprising a first anode and a second anode, said high voltage power supply comprising a transformer having a plurality of connecting points thereon, a first rectifier having an anode and a cathode, means connecting the anode of said first rectifier to a first connecting point on said transformer, means connecting the cathode of said first rectifier to the second anode of said cathode ray tube, a second rectifier having an anode and a cathode, means connecting the anode of said second rectifier to a second connecting point on said transformer, a capacitance voltage divider comprising two capacitors, means connecting the cathode of said second rectifier to a point on the capacitance voltage divider, means connecting said capacitance voltage divider between a third and a fourth connecting point on the transformer, means to alter the parameters of the capacitance voltage divider to effectively connect the cathode of said second rectifier to a point on the transformer intermediate the third and fourth connecting points, and means to connect the cathode of said second rectifier to the first anode of said cathode ray tube.

MARK B. KNIGHT.

REFERENCES CITED

The following references are of record in the file of this patent:

UNITED STATES PATENTS

| Number | Name | Date |
|---|---|---|
| 2,059,683 | Farnsworth | Nov. 3, 1936 |
| 2,104,463 | Johnson et al. | Jan. 4, 1938 |
| 2,458,891 | Boyle | Jan. 11, 1949 |
| 2,472,165 | Mankin | June 7, 1949 |
| 2,487,550 | Holst et al. | Nov. 8, 1949 |
| 2,514,079 | Lockhart | July 4, 1950 |
| 2,555,147 | Meagher | May 29, 1951 |